Patented May 5, 1931

1,803,870

UNITED STATES PATENT OFFICE

GEORGE E. SANDERS, OF NEW YORK, N. Y.

PROCESS OF FORMING COLLOIDAL SUSPENSIONS CONTAINING COPPER AND PRODUCT THEREOF

No Drawing.     Application filed October 3, 1927.  Serial No. 223,850.

My invention relates particularly to colloidal suspensions containing copper adapted to be used as an insecticide, fungicide and antiseptic and the product thereof.

The object of my invention is to provide a process and product thereof, whereby insecticides, fungicides and antiseptics of great effectiveness are obtained. More particularly, the object is to obtain for such purposes colloidal suspensions containing, either in the combined or uncombined form, a metal having insecticidal or fungicidal or antiseptic properties, such as copper, nickel, cobalt, silver, or gold, but my invention relates especially to the utilization of copper for such purposes. Copper, either combined or uncombined, in its colloidal form, has a very much greater effectiveness in the control of fungous diseases than in the case of copper salts generally, and, in fact, is about three times more effective than salts of copper, such as copper carbonate, or Bordeaux mixture, formed by the addition of calcium hydroxide to copper sulphate. Furthermore, these colloidal forms of copper and its compounds, have the advantage of being much safer on fruits and foliage than in the case of other salts of copper. Besides, solutions of salts of copper have the disadvantage of sometimes burning the foliage and of being washed off the foliage very readily. Previous attempts to produce colloidal forms of copper, whether combined or uncombined, have been ineffective due to the very high cost of the processes attempted to be carried out. In such processes, furthermore, difficulty has been experienced generally in that when made in the form of a dry powder by evaporation the colloidal qualities are no longer present and a colloidal suspension can not be obtained from such dry powder. Accordingly, such a product could not be marketed in dry form. In addition, in making a colloidal suspension by following my invention, the copper salt used need not have been previously in colloidal form as I can use such low priced copper salts as copper carbonate or dry lime Bordeaux mixture, or dry magnesium Bordeaux mixture, and produce copper in colloidal form from them. In accordance with my invention I am able to obtain colloidal suspensions, as referred to, at a low cost and the material which produces these suspensions can be marketed in dry powdered form.

While my invention is capable of embodiment in many different forms, I shall describe only certain forms of the same hereinafter.

For example, in carrying out my invention I find that when a mixture of 1 lb. of calcium caseinate and 1 lb. of dry powdered copper carbonate are mixed together in 1 gal. of water, more water may be added, as desired, to dilute the colloidal suspension for spraying. A reaction takes place, resulting in the formation of a colloidal suspension containing copper salts which may be either copper caseinate or a double salt of casein and a copper salt. The result is that the colloidal suspension of copper will remain apparently unchanged for a long period of time, that is to say, for a period of at least two months.

Again, I have mixed 2¼ lbs. of calcium caseinate, with 12 lbs. of paste Bordeaux mixture formed by adding 3 lbs. of calcium hydroxide to 3 lbs. of copper sulphate and 6 liquid ozs. of water, and filtering, or with 50 gals. of Bordeaux mixture in dilute suspension in water comprised of 50 gals. of water, 3 lbs. of calcium hydroxide and 3 lbs. of copper sulphate, or with the dry powdered Bordeaux mixture, as above referred to, or with 1½ lbs. of copper carbonate or with 3 lbs. of Paris green, and in every instance obtain a colloidal suspension of a copper salt which will remain in this form for long periods of time.

I have, also, mixed 3 lbs. of copper sulphate and 3 lbs. of calcium caseinate in 6 gals. of water and produced a Bordeaux mixture, precipitated by the lime of the calcium caseinate which, on settling, produces a suspension of colloidal copper in solution above the Bordeaux precipitate.

In each of the above examples I can use sodium caseinate in the place of calcium caseinate in similar quantities and with similar results. Numerous casein salts may be used instead, as, for example, of magnesium, potassium, barium, strontium, etc., with the same results.

Again, I have used a commercial casein in similar combinations as the above, as, for example 1 lb. of casein, 3 lbs. of calcium hydroxide, 3 lbs. of copper sulphate, and 10 gals. of water.

In the various examples I have found that the colloidal suspension of the copper or copper salt is formed most rapidly and completely when the copper is present in the form of copper carbonate and the casein is present in the form of calcium caseinate. The casein salts of barium, magnesium, and strontium act equally as well as the calcium salts. The potassium and sodium salts of casein will also give a reaction and form a colloidal suspension of copper, but the presence of potassium and sodium in the soluton is sometimes undesirable from the point of view of foliage injury, especially when arsenicals are combined with the colloidal copper. However, when the mixture is designed for use in dormant spray oils sometimes the sodium and potassium salts are more desirable than the others mentioned. Instead of copper carbonate, other salts of copper, such as lime-Bordeaux mixture, or magnesium-Bordeaux mixture, or even Paris green will give colloidal suspensions of copper when combined with casein salts in the manner described. In using a Bordeaux mixture powder it is possible to use straight casein and obtain a suspension of colloidal copper. From this it will be seen that the presence of an alkaline earth metal is advantageous in causing the formation of the colloidal suspension.

In the above example, the amount of copper brought into colloidal form depends upon the proportions of the caseinate used. When the proportion of calcium caseinate is very small, as, for example, 1 part by weight of calcium caseinate to 16 parts by weight of dry Bordeaux powder (containing 12½% metallic copper) is mixed with 50 parts by weight of water, the amount of copper which goes into colloidal suspension within twenty-four hours, is negligible and it takes at least twenty-four hours for such reactions to be brought about. When the proportion is increased, however, as, for example, to 1 part by weight of calcium caseinate to 4 parts by weight of dry powdered Bordeaux mixture (containing 12½% of metallic copper) to 12 parts by weight of water, the reaction is almost immediate and the amount of copper in colloidal form is very appreciable. By still further increasing the proportion of calcium caseinate the major portion of the copper may be brought into the form of colloidal suspension. In the compositions which I use, I prefer proportions of from 30 parts to 133 parts by weight of casein to 100 parts by weight of the metallic copper present in the mixture. In other words, I prefer to use proportions of copper salts and caseinates such as will cause from 20 to 90% of the copper to eventually form a colloidal suspension of the copper, although my invention is not to be limited to these proportions. Such proportions will be used as will accord with the requirements of each plant to be treated and the plant disease to be combated.

It will be understood that in all of the above combinations the dry materials may be mixed together and shipped as such and the water added before using. In some instances, however, the dry materials may be used as such. For example, in the case of treating seed grain for smut, a mixture containing 20 lbs. of copper carbonate and 10 lbs. of calcium caseinate is coated dry over the seed. After the seed is sown the moisture, which causes the seed to germinate, will also cause the formation of a highly active colloidal copper from the compound dusted on the seed. In making up the dry mixture it is preferably first to dry the copper compound and then add the casein or caseinate to the same so as to avoid subjecting the caseinate to the heat of drying the copper, although this is not necessary, and, instead, the two constituents may be dried together.

When it is desired to make up a solution containing merely the colloidal copper or copper salt in suspension, when using the liquids containing the copper in colloidal suspension, the casein compound, copper compound and water are mixed together in such proportions as to give the maximum quantity of copper in suspension and the solution containing the copper in colloidal suspension is passed through a filter, the characteristic of the colloidal copper or copper salt being such that it will pass through a filter. This solution is particularly of value as a fungicide designed to leave a minimum amount of marking on the foliage, as in the case of roses, other flowers and fruits.

In making up a paste copper fungicide I prefer to add 4 lbs. of casein or 10 lbs. of calcium caseinate to 50 lbs. of paste formed by adding 25 lbs. of calcium hydroxide and 25 lbs. of copper sulphate to 50 gals. of water and filtering, as otherwise some of the colloidal copper would be lost in the filter water.

It will be understood, furthermore, that the above mixtures may be added to other insecticides or fungicides, either before or after causing them to react in water. For example, dry arsenical compounds or derris or pyrethum or other insecticidal powders may be added to the dry mixture of the copper compound and the casein compound, or various fungicides or insecticides, such as emulsified oils, nicotine or derris compounds, etc., may be mixed with the wet colloidal copper mixture.

In describing and claiming my invention, it is to be understood that wherever I have mentioned colloidal copper I mean to include thereby either copper as such or a copper compound in colloidal suspension. The same is true as to the other fungicidal, insecticidal or antiseptic metals such as referred to hereinabove. The salts of all these metals are such as to kill low forms of life and are, thus, fungicidal, insecticidal and antiseptic. Also, it is to be understood that wherever I have referred to a casein compound, this is to be understood as including either casein or a caseinate.

While I have described my invention above in detail I wish it to be understood that many changes may be made therein without departing from the spirit of the same.

I claim:

1. A process which comprises forming a colloidal suspension containing a metal, the salts of which are adapted to kill low forms of life, by reacting upon a compound of such a metal with a casein compound, the proportion of the casein compound being not less than 1 pound of actual casein to 2 pounds of the metallic metal.

2. A process which comprises forming a colloidal suspension containing copper by reacting upon a copper compound with a casein compound, the proportion of the casein compound being not less than 1 pound of actual casein to 2 pounds of metallic copper.

3. A process which comprises forming a colloidal suspension containing a metal, the salts of which are adapted to kill low forms of life, by reacting upon a compound of such a metal with calcium caseinate, the proportion of calcium caseinate consisting of 25% casein, being not less than 2 pounds of said caseinate to 1 pound of metallic metal.

4. A process which comprises forming a colloidal suspension containing copper by reacting upon a copper compound with calcium caseinate, the proportion of calcium caseinate consisting of 25% casein being not less than 2 pounds of said caseinate to 1 pound metallic copper.

5. A process which comprises forming a colloidal suspension containing a metal, the salts of which are adapted to kill low forms of life, by reacting upon a compound of such a metal with a casein compound, the proportion of casein compound being not less than 1 pound of actual casein to 2 pounds of the metallic metal, in the presence of a compound of an alkali-forming metal.

6. A process which comprises forming a colloidal suspension containing copper by reacting upon a copper compound with a casein compound, the proportion of the casein compound being not less than 1 pound of actual casein to 2 pounds of the metallic copper, in the presence of a compound of an alkali-forming metal.

7. A dry composition containing a compound of a metal, the salts of which are adapted to kill low forms of life, and a casein compound adapted to react upon the metal compound in the presence of water to form a colloidal suspension of said metal, the proportion of the casein compound being not less than 1 pound of actual casein to 2 pounds of the metallic metal.

8. A dry composition containing a compound of copper and a casein compound adapted to react upon the metal compound in the presence of water to form a colloidal suspension of said copper, the proportion of the casein compound being not less than 1 pound of actual casein to 2 pounds of the metallic copper.

9. A composition containing Bordeaux mixture and a casein compound adapted to react upon the metal compound in the presence of water to form a colloidal suspension of said metal, the proportion of casein compound being not less than 1 pound of actual casein to 2 pounds of metallic metal.

10. A composition containing Bordeaux mixture and calcium caseinate adapted to react upon the metal compound in the presence of water to form a colloidal suspension of said metal, the proportion of the calcium caseinate consisting of 25% casein, being not less than 2 pounds of said caseinate to 1 pound of the metallic metal.

In testimony that I claim the foregoing, I have hereunto set my hand this 30th day of September, 1927.

GEORGE E. SANDERS.